March 29, 1955     F. J. KIRKMAN     2,705,250
PRIMARY CELL AND BATTERY
Filed Oct. 1, 1953     2 Sheets-Sheet 1
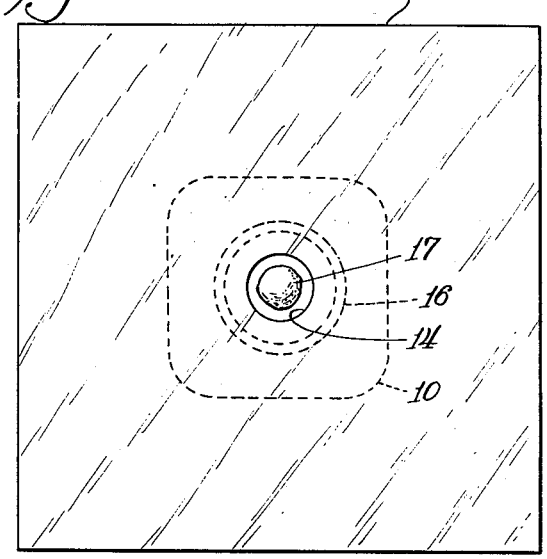
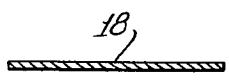
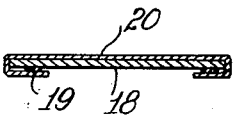
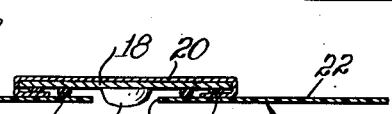
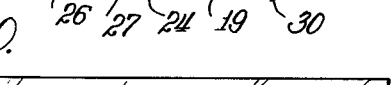
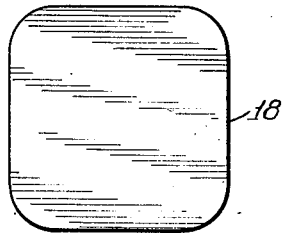
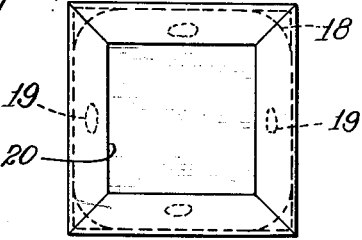
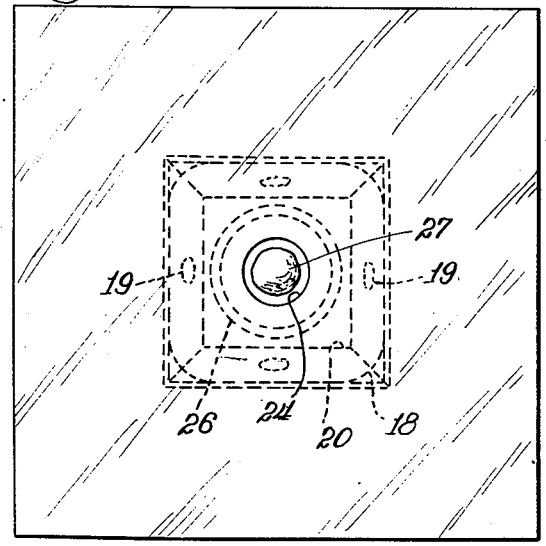
INVENTOR.
Fredrick J. Kirkman
BY
Jones, Lesch & Darbo
Attys.

March 29, 1955 F. J. KIRKMAN 2,705,250
PRIMARY CELL AND BATTERY
Filed Oct. 1, 1953 2 Sheets-Sheet 2
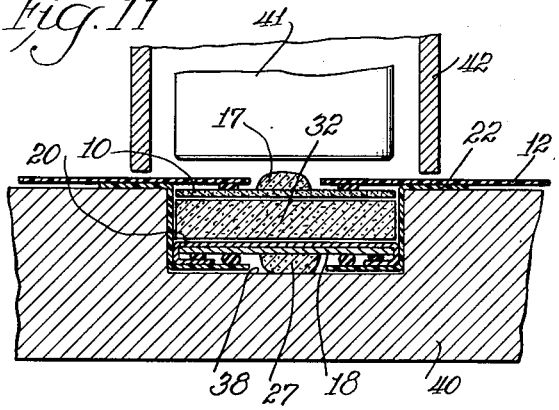
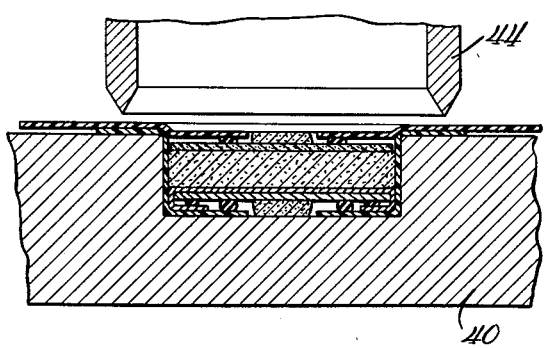
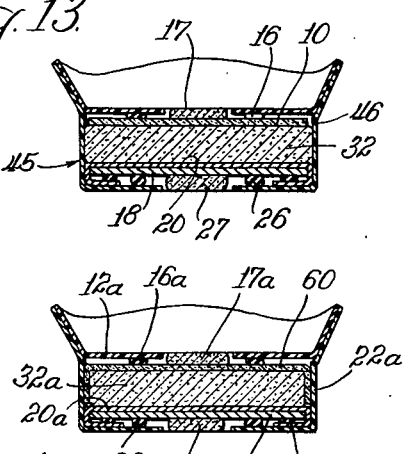
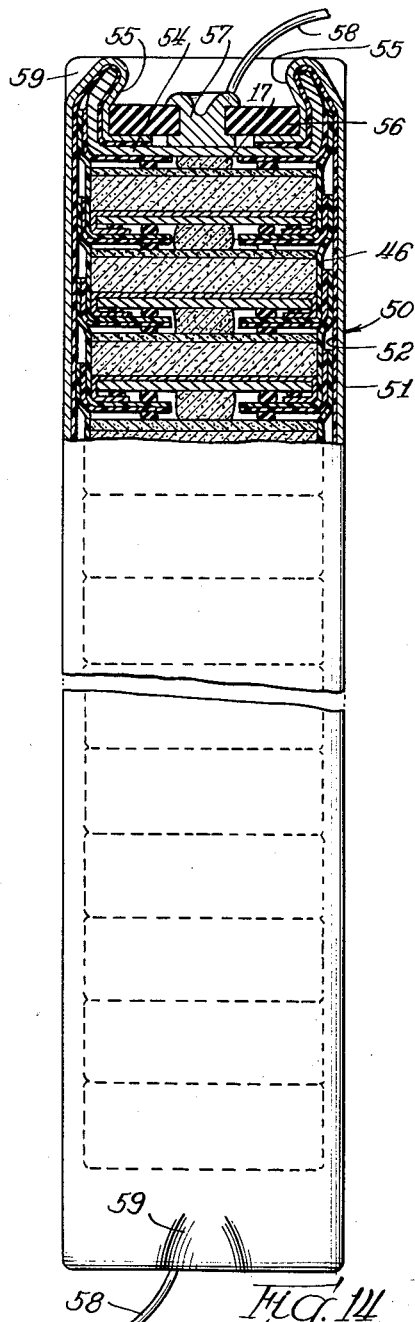
INVENTOR.
Fredrick J. Kirkman
BY
Jones, Jesel + Danbo
Attys.

United States Patent Office 2,705,250
Patented Mar. 29, 1955

2,705,250

PRIMARY CELL AND BATTERY

Fredrick J. Kirkman, Freeport, Ill., assignor to Burgess Battery Company, Freeport, Ill., a corporation of Delaware Application October 1, 1953, Serial No. 383,441

15 Claims. (Cl. 136—111)

This invention relates to primary cells of the flat type, that is, cells in which the cell elements are thin and flat and are arranged in parallel, juxtaposed, sandwich-like relation, and to batteries composed of such cells. The invention relates to an improved construction which is especially adapted for very small flat cells which are intended to be stacked together and connected in series to form multiple-cell batteries, and to the batteries so formed. The batteries are adapted for use in electronic equipment where the small size of the battery is important, such as in hearing aids and other portable electronic equipment.

In batteries of this character, a problem is presented in making a good electrical connection between the cells which is of high conductivity and is rugged and permanent and does not break or become loosened with jarring and other stresses which occur during shipping, handling, and use. There is also the problem of isolating the electrolyte of one cell from the electrolyte of the others, whereby there is no leakage of electrolyte between cells. Such leakage would result in short circuits, local action at the negative electrodes, loss of energy and capacity and generally unsatisfactory performance and failure.

There is also the problem in small batteries of the character described of making a structure which is satisfactory from the performance standpoint and is still simple and economical from the standpoint of material, structure and method of fabrication.

It is an object of the present invention to provide an improved cell structure for small flat cells in which the foregoing problems are satisfactorily met, whereby highly conductive, rugged intercell connections are provided, and the electrolyte of the individual cells is effectively isolated.

Another object of the invention is the provision of a cell of the character described in which the zinc anode is effectively separated from the depolarizer mix whereby it is not possible for particles of the mix to come in contact with the anode and create local couples.

Another object is the provision of a cell of the character described in which the active elements are completely enclosed by a dielectric envelope, whereby the cell can be aged and then tested for defects, before it is incorporated in a multiple-cell battery.

Another object is to provide a cell construction which permits substantial flexibility or leeway in the amount of mix, whereby control does not need to be precise and variations can be made to adapt the cell to different types of service.

Another object is to provide a cell construction in which a relatively wet and plastic mix is used which is molded to the final shape and dimensions under pressure in situ in the cell, with resulting advantageous distribution of mix, pressure conditions, and simplicity of manufacture.

Another object is to provide a multiple-cell battery composed of a stack of cells of the character described in which the pressure within the stack is distributed over a dielectric retaining means of wide area and high strength.

Another object is the provision of improved cell and battery constructions which are simple and economical from the various standpoints of structure, materials, and method of fabrication of the cells and the batteries.

Other objects and advantages will become apparent as the following description progresses in which several embodiments of the invention are set forth, which description is to be taken in connection with the accompanying drawings, in which:

Fig. 1 is a transverse sectional view of a positive electrode for an embodiment of the cell of the invention;

Fig. 2 is a transverse sectional view of a positive electrode unit including the positive electrode of Fig. 1 and a non-conductive sheet member;

Figs. 3 and 4 are plan views of the structures of Figs. 1 and 2, respectively;

Fig. 5 is a transverse sectional view of a negative electrode for the same cell embodiment;

Fig. 6 is a transverse sectional view of said negative electrode and an associated bibulous non-conductive sheet;

Fig. 7 is a transverse sectional view of a negative electrode unit including the zinc electrode, the bibulous sheet and a non-conductive impervious sheet;

Figs. 8, 9 and 10 are, respectively, plan views of the structures of Figs. 5, 6 and 7;

Figs. 11 and 12 are transverse sectional views of the same cell embodiment at different stages in its completion;

Fig. 13 is a transverse sectional view of the completed cell;

Fig. 14 is a side view, partly in section, of a multiple cell battery employing the cell embodiment shown in Fig. 13, and Fig. 15 is a transverse sectional view of a different embodiment of the cell of the present invention.

Referring to Figs. 1 and 3, the positive electrode 10 is a thin, sheet-form member composed of carbon particles and a binder, or it may be a fabric member, such as cloth, impregnated with a carbonaceous composition. Carbonaceous elements of this character are known and member 10 will not be described in detail. The electrode 10 possesses the requisite conductivity and is preferably flexible. As seen in Fig. 3 it is square in shape, and the cell is likewise of square shape. This shape factor is of no significance in the present invention, and any suitable shape may be used, such as oblong, round, oval, etc.

As seen in Figs. 2 and 4, there is associated with the positive electrode 10 a thin sheet or film 12 of non-conductive impervious, electrolyte-resistant material, such as the rubber hydrochloride product known as "Pliofilm," the co-polymer of vinyl acetate and vinyl chloride, or the like. The sheet 12 is flexible and thermoplastic whereby it can be caused to adhere to itself by the application of heat thereto as is known. It has an aperture 14 located substantially centrally thereof. The electrode 10 is arranged in parallel adjacent relation to and substantially centrally of the sheet 12, whereby the electrode overlies the aperture 14. The sheet 10 is also square in shape and is of larger area than the electrode 10 whereby a peripheral marginal portion of the sheet extends beyond the edges of the electrode. The sheet 12 is attached to the electrode 10 by an electrolyte-resistant adhesive 16 which is arranged between the sheet and the electrode and is in the form of a ring surrounding the opening 14. The adhesive 16 may be composed of any suitable electrolyte-resistant material, such as asphalt, pitch or the like. A small mass of plastic conductive composition 17 is then applied to the surface of electrode 10 which is exposed at opening 14. A suitable conductive composition for the purpose is one made up of finely divided silver particles in a wax-like binder-lubricant, which may be composed of microcrystalline wax, paraffin wax or the like as is disclosed in the co-pending application of Sam Kurlandsky, Serial No. 161,892, filed May 13, 1950, now Patent No. 2,666,803. It is preferably applied in the heated condition when it is soft and makes intimate adhesive contact with the electrode. The assembly composed of electrode 10, sheet 12, adhesive ring 16 and conductive mass 17 constitutes a pre-assembled positive electrode unit which has advantages in the cell structure and fabrication as will be described hereinafter.

A negative electrode unit will now be described in connection with Figs. 5 to 10. As shown in Figs. 5 and 8, the negative electrode or anode 18 is a thin, square sheet

operations whereby smooth folds and tucks are formed.

A stiff dielectric plate 56 having a conductive terminal 57 projecting therethrough is placed within the tray with the terminal in contact with the exposed bottom of the tray. The plate is composed of a suitable dielectric material such as synthetic resin, fiberboard or the like. The battery terminal lead 58 is suitably connected to the plate terminal 57.

To form the closure, the upwardly projecting rim of the tray 54 and the portions of the casing 50 which cover said rim are locally crimped inwardly a substantial distance whereby the crimps 59 so formed press downwardly upon the marginal portion of plate 56 and clamp said plate firmly in position. Such clamping action creates a locked closure which maintains the stack of cells firmly compressed. It also creates firm mechanical and electrical pressure contact between the terminal 57 and the bottom of tray 54 and between the bottom of tray 54 and the conductive mass 17 of the uppermost cell. The number and location of the crimps 59 may be as desired, there being one such crimp located substantially centrally of each side wall of the tray in the specific embodiment of Fig. 14. As stated heretofore, the same closure-terminal arrangement is provided at the other end of the battery, and such arrangement will not be described herein. The closure structure which has been described is the subject of the copending application of Ray D. Arbogast, Serial No. 383,587, filed October 1, 1953.

In the cell of the present invention, the zinc anode is effectively separated from the depolarizer mix so that it is not possible for the particles of the mix to make contact with the anode and create local couples. The bibulous separator 20 being folded around the edge and upon the rear margin of the anode and being adhesively joined to said margin, the particles of mix are effectively prevented from coming into contact with the anode. The adhesive juncture of the impervious sheet 22 with the anode by means of the ring 26 also assists in preventing access of mix particles to the anode.

As has been stated heretofore, in the cell of the invention the active elements are completely enclosed in the dielectric envelope 46 whereby the cell can be aged and then tested for defects before it is incorporated in the battery.

The cell also permits substantial leeway in the amount of mix, whereby control need not be exact, and the amount may be varied to adapt the cell for a particular type of service. This flexibility is provided by employing a relatively wet mix which is soft, plastic and easily molded under pressure, and providing space within the cell envelope 46 into which the mix can move laterally under the pressure. In the battery of the present invention, when the stack of cells is compressed longitudinally, the mix cakes spread laterally and substantially fill the cell envelopes, and the overall length of the battery is determined by the aggregate amount of mix present in the cells thereof.

In the multiple-cell battery of the invention the pressure created in compacting the stack of cells is distributed over a retaining means of relatively wide area and high strength since in each cell the envelope 46 extends outwardly to the wall of the casing 50 whereby substantially the entire area and strength of the casing serves to fortify and strengthen the envelopes for the individual cells. Cells usually undergo expansion in use with resulting increase in internal pressure, and the retaining means of wide area and high strength is useful in resisting the force created by such pressure. Such strengthened envelopes also resist the leakage of the electrolyte from the individual cells.

The cells and battery of the present invention are also economical of space since the only separations between the cells are the very thin sheets or films 12 and 22. As a result, a maximum amount of space within the casing is occupied by the active elements.

The cells are simple and economical from the standpoint of both structure and manufacture. All of the elements including the mix cake are initially in the form of sheets or strips which are blanked out to form the elements. Such a structure lends itself to rapid machine production, and the result is a cell of structural simplicity. Also, close control is easily obtained, and as one attribute of this, the openings 14 and 24 of the impervious sheets 12 and 22 are located centrally of the adjacent electrodes, whereby in the multiple cell battery the openings of contiguous sheets are in substantially exact registry with one another which insures satisfactory intercell connection by the masses 17 and 27.

A different embodiment of the cell of the invention is shown in Fig. 15. This cell is similar to the cell which has been described with the difference that the positive electrode is in the form of an open-top carbon cup 60, and the depolarizer mix body is contained within the cup. Except for this difference, the structure is the same as in the cell of Fig. 13, and corresponding parts are designated by the same numerals with the addition of the suffix "a."

While only two embodiments of the invention have been described, the invention is not limited thereto and changes and modifications may be made within the spirit of the invention by those skilled in the art.

Invention is claimed as follows:

1. A flat cell made up of a plurality of flat cell elements in sandwich-like arrangement, comprising a pair of pre-assembled positive and negative electrode units, each said electrode unit comprising a flexible, impervious, non-conductive sheet having an opening therein, an electrode adjacent to said sheet and overlying said opening, said sheet being of greater area than said electrode whereby a peripheral margin of said sheet extends beyond said electrode, and a ring of electrolyte-resistant adhesive between said electrode and said sheet and surrounding said opening and attaching said sheet in sealing relation to said electrode, said negative electrode unit having a bibulous, non-conductive sheet upon the surface of the electrode remote from the impervious sheet and folded around the edges of the electrode and having the marginal portions thereof covering the marginal portions of the surface of the electrode adjacent to the impervious sheet, said marginal portions of said bibulous sheet being adhesively joined to said negative electrode, said electrode units each being arranged with the impervious sheet toward the outside of the cell, and a depolarizer element between said electrode units, the peripheral margins of said impervious sheets being joined together in sealing relation whereby with said last mentioned seal joint and the seal joints made by said adhesive rings a liquid-tight envelope is formed which seals the interior of said cell from the atmosphere.

2. A flat cell made up of a plurality of flat cell elements in sandwich-like arrangement, comprising a pair of pre-assembled positive and negative electrode units, each said electrode unit comprising a flexible, impervious, non-conductive sheet having an opening therein, an electrode adjacent to said sheet and overlying said opening, said sheet being of greater area than said electrode whereby a peripheral margin of said sheet extends beyond said electrode, and a ring of electrolyte-resistant adhesive between said electrode and said sheet and surrounding said opening and attaching said sheet in sealing relation to said electrode, said electrode units each being arranged with the impervious sheet toward the outside of the cell, a depolarizer element and a bibulous non-conductive element between said electrode units, said bibulous non-conductive element being adjacent to said negative electrode, the peripheral margins of said impervious sheets being joined together in sealing relation whereby with said last mentioned seal joint and the seal joints made by said adhesive rings a liquid-tight envelope is formed which seals the interior of said cell from the atmosphere.

3. A flat cell made up of a plurality of flat cell elements in sandwich-like arrangement, comprising a positive electrode, a negative electrode and a depolarizer body between said electrodes, a bibulous non-conductive sheet between said negative electrode and said depolarizer body, said bibulous sheet being folded around the edges of said negative electrode and having marginal portions thereof covering and adhesively attached to marginal portions of the surface of said negative electrode remote from said depolarizer body, a flexible, impervious, non-conductive sheet adjacent to the exterior surface of each of said electrodes, each said impervious sheet having an opening therein exposing a portion of the adjacent electrode, and a ring of electrolyte-resistant adhesive attaching each said impervious sheet to the electrode adjacent thereto and surrounding said opening in said impervious sheet, said impervious sheets having peripheral margins extending beyond said electrodes and joined together in sealing relation to form an envelope for said cell.

water so as to render the technical application of water possible. Therefore, it is of no consequence which hydroxides or salts are employed provided that they are sufficiently water-soluble and neutral, i. e. they must not form stable addition products with the nitrogen compounds to be separated and that they do not undergo reaction with the nitrogen compounds. Especially suitable salts are, for instance, common salt, sodium sulphate, sodium carbonate, sodium phosphate, sodium acetate, sodium formate as well as the corresponding potassium salts and alkali hydroxides, such as sodium and potassium hydroxide. Further substances which may be employed, are described, for instance, in British specification No. 475,818. The said salt solution may contain according to the special requirements only small amounts of the salt or quantities up to saturation. On using alkali hydroxides, solutions containing from about 5% to about 40% of the hydroxide are preferred.

Which of the nitrogen compounds is preferably absorbed depends on the nature of the absorbent applied. Thus, the invention permits of adapting the process to the prevailing conditions of the various absorbents in the single steps of the reaction. On the other hand, it is possible to apply the absorbents in combination in the same step as far as they agree as to their separating activity. For instance, the weak acids may be employed in combination with neutral solvents boiling not substantially lower than the weak acid applied and being indifferent to the weak acid as well as to the nitrogen compounds and yielding homogeneous mixtures with the weak acid. Suitable solvents are for instance o-dichlorobenzene, 1.2.4-trichlorobenzene, nitrobenzene, tetralin, dekalin, higher boiling aliphatic or aromatic hydrocarbons as far as they are still liquid under the reaction conditions applied, as well as higher boiling ethers, alcohols, ketones and polyalcohols.

The application of mixtures of the weak acids with the organic solvents is especially advantageous in the separation of ammonia from mixtures containing methyl amines and in the separation of a mixture consisting of mono- and dimethylamine. Furthermore, it is possible in the separation of trimethylamine from methylamine mixtures being free of ammonia to increase the separating activity of the weak acids by addition of water. Of course, water must not be added in quantities exceeding saturation at the temperatures employed.

The process according to the invention may be advantageously carried out by a continuous method by feeding the reaction mixture, if desired under pressure, in a reaction tower counter-currently to the flow of the absorbent. By appropriately adjusting the flow velocity and the temperature one or more nitrogen compounds are selectively dissolved in the weak acids or in the said other absorbents applied whereas the nitrogen compounds not absorbed escape as vapours at the top of the reaction tower. The absorbed compounds are expelled from the absorbent as described above. By repeating the process once or several times each of the components contained in the starting mixture may be obtained in pure form.

The process herein described is substantially different from that disclosed in German Patent 615,527. German Patent 615,527 comprises the separation of trimethylamine and ammonia by treatment with acids in quantities insufficient for neutralization. The resultant salts cannot be decomposed again by merely heating or by reducing the pressure.

The invention is further illustrated by the following examples, without being restricted thereto.

Example 1

A mixture of 62.5% by volume of ammonia and 37.5% by volume of trimethylamine is passed through a liquid mixture of 25% by weight of phenol and 75% by weight of o-dichlorobenzene. At the beginning the mixture is completely absorbed. After saturation of the absorbent a mixture of 90% by volume of ammonia and 10% by volume of trimethylamine escapes. The mixture of ammonia and trimethylamine dissolved in the absorbent is expelled again by heating to 170° C. The mixture consists of 33% by volume of ammonia and 67% by volume of trimethylamine. By repeating the process several times, each of the two components is obtained in pure form.

Example 2

A mixture of ammonia and dimethylamine is introduced into a molten mixture of α- and β-naphthol, the proportion of the mixtures being 1:1. After saturation of the naphthol melt at about 90° C. with the bases a gas mixture consisting of 68% by volume of ammonia and 32% by volume of dimethylamine escapes. By repeating the process several times, each of the two components is obtained in pure form.

Example 3

400 parts by weight of a solvent mixture consisting of 25% by weight of phenol and 75% by weight of o-dichlorobenzene is saturated with a mixture consisting of 78% by volume of trimethylamine and 22% by volume of ammonia. 108 parts by weight of the mixture are totally absorbed. Thereupon pure trimethylamine is introduced into the saturated solution through a glass frit. The escaping gas mixture consists of 50% by volume each of ammonia and trimethylamine. As soon as the content of ammonia in the escaping gas decreases feeding of pure trimethylamine is stopped. By heating the solution 112 parts by weight of a 96.5% trimethylamine are obtained.

Example 4

M-cresol and a gas mixture of approximately equal parts by volume of ammonia, dimethylamine, and trimethylamine are contacted in countercurrent in an absorption tower packed with Raschig rings, said absorption tower having a length of 2.50 m. and a diameter of 3 cm. 45 liters of the aforesaid mixture and 120 grams of m-cresol are charged each hour. The gas escaping at the top of the tower consists of 99% ammonia whereas the mixture of methylamines expelled from the absorbent is almost free from ammonia.

Example 5

The mixture of dimethylamine and trimethylamine set free on heating the sump obtained according to Example 4 is contacted with m-cresol in an absorption tower as indicated in Example 4. About 48 liters of the mixture of the methylamines and 90 grams of m-cresol are charged each hour. 98% trimethylamine escapes at the top of the reaction tower whereas a 90% dimethylamine is obtained by heating the sump solution.

Example 6

A mixture consisting of 55% by volume of ammonia, 15% by volume each of mono-, di-, and trimethylamine is contacted in countercurrent with a technical cresol mixture (30 grams per hour) in an absorption tower packed with Raschig rings, said absorption tower having a diameter of 25 mm. and a height of 2.50 m.; the throughput of said mixture amounts to 30 liters per hour. The non-absorbed gas contains 100% of the amount of ammonia charged and 95% of the trimethylamine charged and is free from mono- and dimethylamine.

The mixture absorbed by the cresol and containing besides small amounts of trimethylamine, the whole mono- and dimethylamine is contacted after expelling from the solvent with a mixture consisting of 1 part by weight of phenol and 3 parts by weight of o-dichlorobenzene in the same reaction tower and in similar manner.

100% monomethylamine escapes at the top of the reaction tower whereas 92% dimethylamine is obtained from the sump solution.

Example 7

A mixture of 49% by volume of ammonia and 17% by volume each of mono-, di-, and trimethylamine at a rate of 29 liters per hour is contacted, in countercurrent, at room temperature with a caustic soda solution of 10% strength in an absorption tower packed with Raschig rings and having a height of 2.50 m. and a diameter of 25 mm. The gas mixture is fed at a point in the middle of the tower, the sump of the absorption tower is heated to 45° C. When charging 70 cm.³ of caustic soda solution per hour 100% trimethylamine is taken off from the top of the tower. The dissolved nitrogen compounds are practically free from trimethylamine.

The dissolved mixture of nitrogen compounds is expelled by heating and contacted in a similarly constructed tower with a technical cresol mixture of such an amount that the mono- and dimethylamine contained in the mixture are dissolved whereas pure ammonia escapes at the top of the tower.

beyond said electrodes and joined together in sealing relation to form an envelope for said cell.

References Cited in the file of this patent

UNITED STATES PATENTS

| | | |
|---|---|---|
| 2,307,761 | Deibel | Jan. 12, 1943 |
| 2,307,766 | Deibel | Jan. 12, 1943 |
| 2,436,382 | Deibel et al. | Feb. 24, 1948 |
| 2,579,743 | Kurlandsky | Dec. 25, 1951 |

FOREIGN PATENTS

| | | |
|---|---|---|
| 495,667 | Canada | Sept. 1, 1951 |